Nov. 3, 1970 — T. E. LOHR — 3,537,750
HEADREST ASSEMBLY
Filed July 3, 1968
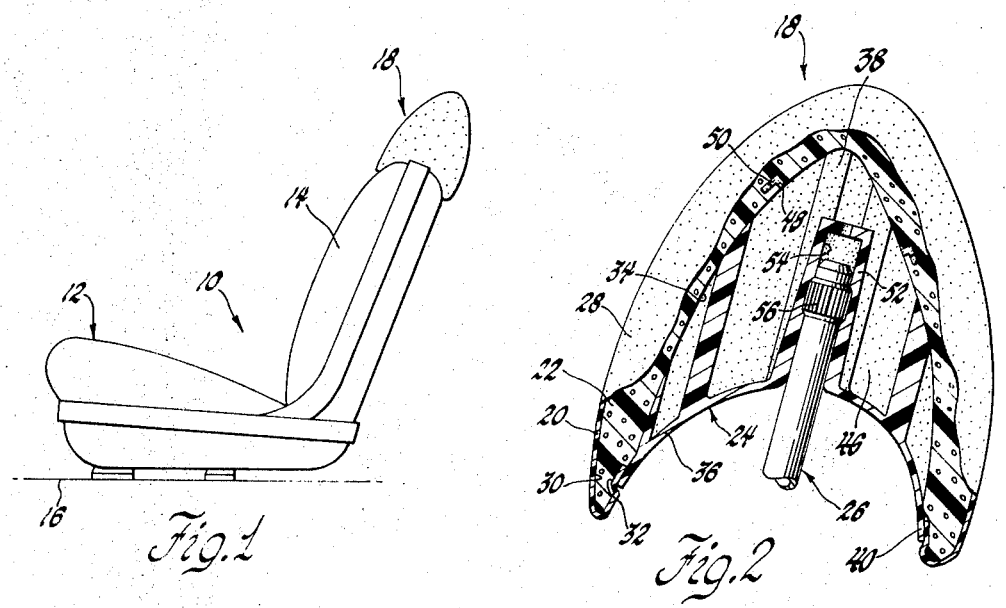
Fig. 1
Fig. 2
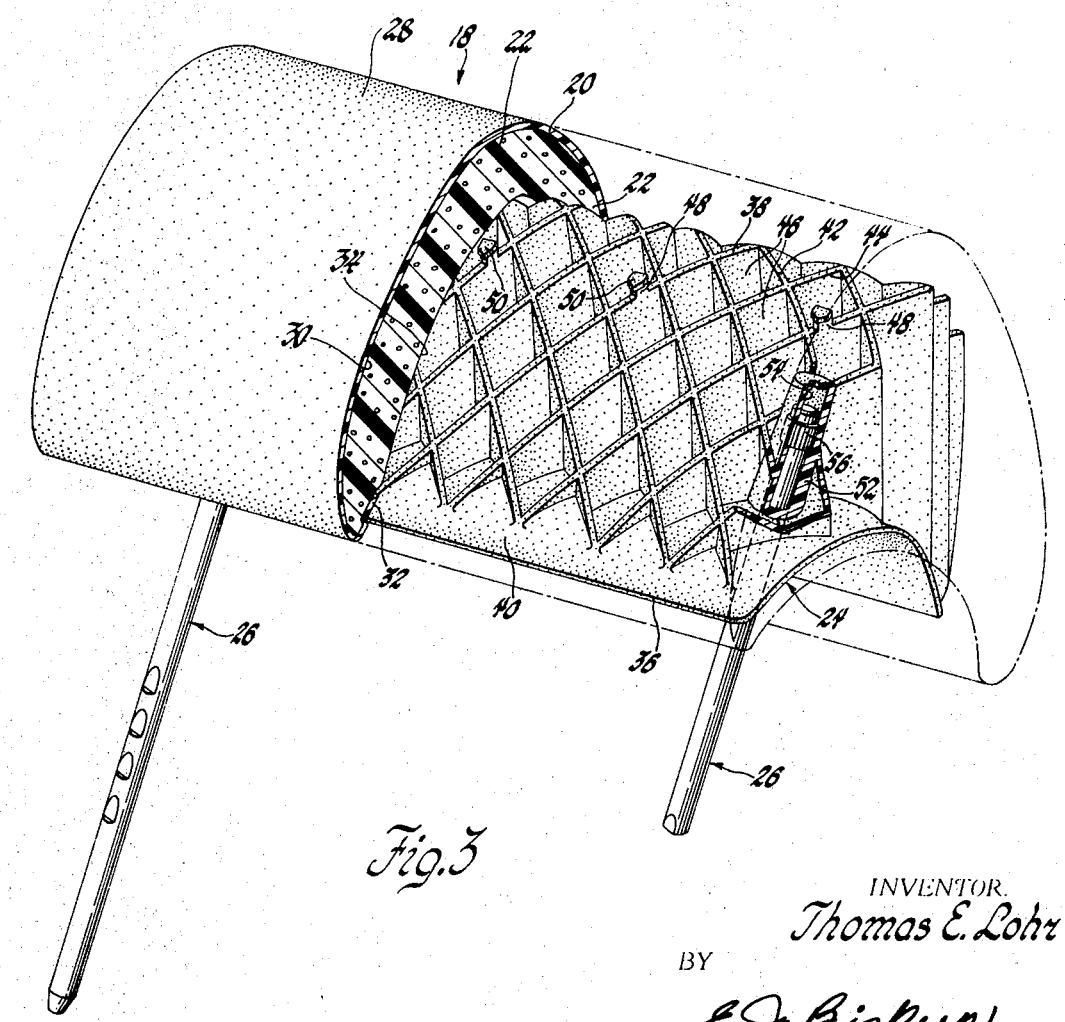
Fig. 3
INVENTOR.
Thomas E. Lohr
BY
E. J. Biskup
ATTORNEY

United States Patent Office 3,537,750
Patented Nov. 3, 1970

3,537,750
HEADREST ASSEMBLY
Thomas E. Lohr, Warren, Mich., assignor to General Motors Corporation, Detroit, Mich., a corporation of Delaware
Filed July 3, 1968, Ser. No. 742,375
Int. Cl. A47c 7/36, 7/42
U.S. Cl. 297—410                                      4 Claims

ABSTRACT OF THE DISCLOSURE

A motor vehicle headrest construction characterized by separate head supporting and structural support subassemblies. The structural support subassembly includes a plastic reinforcing member having an upwardly extending honeycomb core and a pair of support bars which are adapted to be adjustably mounted on a seating unit. The resilient head supporting subassembly includes an exterior vinyl shell and an integrally bonded interior foam padding. The honeycomb core is inserted within a pocket formed in the head supporting subassembly and is secured thereto by means of retention tabs which are embedded in the foam padding.

---

Many headrests currently in use on motor vehicles employ a seamless exterior vinyl shell and an interior foam padding construction. The shell is initially formed by a casting operation and is thereafter transferred to a retaining mold. A metallic reinforcing member including the headrest support bars is located within the shell cavity. Thereafter, a foaming urethane resin is poured into the shell cavity. The urethane foam expands within the shell cavity to form a foam padding which is integrally bonded to the interior surface of the shell and to the reinforcing member. The opening of the shell cavity is then decoratively covered by a vacuum-formed vinyl patch which is adhesively attached to the rim of the cavity.

The present invention contemplates separate subassemblies for the aforementioned resilient and reinforcing structural components. The first subassembly comprises and exterior seamless shell and an internal foam padding having a downwardly opening pocket formed therein. The second subassembly comprises the equivalents of the reinforcing member, the support bars and the vinyl patch. The reinforcing member is formed from a plastic material and includes a base plate conforming in shape to the rim of the shell and an upwardly extending honeycomb core. The lateral and longitudinal configuration of the honeycomb core conform to the shape of the pocket. The headrest is conveniently and easily assembled by pressing the first subassembly over the honeycomb core until the rim of the shell compressively engages a peripheral flange of the base plate. A plurality of retention tabs on the honeycomb core are embedded into the foam padding to fixedly secure the first subassembly to the second subassembly. A pair of downwardly opening receptacles are formed in the base plate and fixedly receive a pair of headrest support bars. The headrest support bars are adapted to be adjustably secured to a motor vehicle seatback and to cooperate therewith for locating the headrest at a plurality of head supporting positions. It will be appreciated that the use of the above described non-metallic reinforcing construction reduces the overall weight of the headrest as well as the amount of resin required for the foam padding. Additionally, the use of separate subassemblies reduces the number of assembling operations.

Accordingly, the objects of the present invention are: to provide a headrest construction wherein a plastic reinforcing member including a spacially contoured honeycomb core supports a resilient padding structure; to provide a headrest assembly comprising two subassemblies, the first subassembly including a seamless exterior shell and an interior foam padding having a downwardly opening pocket formed therein, the second subassembly including a honeycomb core received within and conforming to the shape of the pocket and having a base plate attached to the rim of the cavity; and to provide a headrest construction wherein a resilient head supporting structure is supported by a honeycomb structure formed on a reinforcing member and is secured to the honeycomb structure by means of retention tabs, the reinforcing member having support bars attached thereto which are adapted to be adjustably attached to the seatback of a motor vehicle seating unit.

These and other objects will be apparent to one skilled in the art upon reading the following detailed description, reference being made to the accompanying drawings in which:

FIG. 1 is a side elevational view of a seating unit incorporating a headrest made in accordance with the present invention;

FIG. 2 is an enlarged partially sectioned side view of the headrest shown in FIG. 1; and FIG. 3 is a partially sectioned perspective view of the headrest shown in FIG. 1.

Referring to FIG. 1, there is shown a motor vehicle seating unit 10 including a seating cushion 12 and a seatback 14. The seating cushion 12 is suitably attached to a support surface such as a vehicle floor panel 16. A headrest 18, made in accordance with the present invention, is adjustably mounted at the top of the seatback 14 in a head supporting relationship.

As shown in FIG. 3, the headrest 18 generally comprises an exterior shell 20, an interior foam padding 22, a reinforcing member 24, and a pair of support bars 26.

The shell 20, as shown in FIG. 2, is formed to a thickness of approximately 0.030 inch from a plastic material such as vinyl by any suitable process such as rotational molding. The molded shell 20 has a spacially contoured exterior surface 28, an interior surface 30 and an inwardly turned peripherally extending rim 32. The interior surface 30 defines a shell cavity having an opening at the rim 32.

The foam padding 22 is bonded to the interior surface 30 of the shell 20 in a molding operation. The molded shell 20 is received within a retaining mold and a mold core corresponding in shape to the reinforcing member is inserted within the shell cavity. A foaming urethane resin is then poured into the shell cavity. The urethane resin subsequently expands within the shell cavity to form the foam padding 22 which has an integral bond with the interior surface 30. After the resin has cured, the mold core is withdrawn and the resilient head supporting structure or subassembly thus formed has a pocket 34 formed therein having an opening contiguous with the rim 32.

Referring to FIG. 3, the reinforcing member 24 is injection molded from a suitable plastic material such as polypropylene and generally comprises an arcuately curved rectangular base plate 36 and an upwardly extending honeycomb core 38. The base plate 36 includes a peripheral flange 40 which, in final assembly, overlies and compressively engages the rim 32 of the shell 20.

The honeycomb core 38 comprises a network of upwardly extending mutually intersecting side walls 42 and 44 which define a plurality of repetitively geometrically shaped core sections 46. The lateral and longitudinal configurations of the side walls 42 and 44 define a spacially contoured surface substantially conforming to the shape of the pocket 34. While the preferred embodiment of the honeycombed core 38 uses quadrilateral core sections 46, it should be apparent that other geometrical shapes such as hexagons could advantageously be used.

A plurality of foam retention tabs 48 are transversely formed on the side walls 44 and include downwardly turned tips 50 that are adapted to fixedly engage the foam padding 22 in final assembly. A pair of laterally spaced receptacles 52 are formed in the base of reinforcing member 24. Each receptacle 52 has a bore 54 opening downwardly adjacent the under surface of the base plate 36.

To minimize the weight and material required for the reinforcing member 24 while maintaining the requisite structural rigidity, the following parameters are recommended: thickness of the side walls 42 and 44, 0.060 inch; thickness of the base plate 36, 0.120 inch; spacing between adjacent side walls, 0.750 inch based on a 60° acute angle quadrilateral core section 46.

The support bars 26 are formed of steel tubing and include an upper knurled surface 56. The upper end of the support bar 26 is pressed within the receptacle 52 such that the knurled surface 56 fixedly engages the inner surface of the bore 54. The structural support or second subassembly thus formed includes the reinforcing member 24 and the support bars 26.

The first subassembly is secured to the second subassembly by inserting the honeycomb core 38 within the pocket 34 until the top portion of the foam padding 22 is compressively deformed and the flange 40 engages the rim 32. When the loading is released, the internal elastic forces of the foam padding 22 restore the first subassembly to its molded shape and, in the process, the tips 50 of the foam retention tabs 48 are embedded in the interior surface of the padding 22. While under ordinary circumstances the foam retention tabs 48 serve to fixedly secure the shell 20 and the padding 22 to the reinforcing member 24, a suitable adhesive can be applied to the interface between rim 32 and the flange 40 to serve as additional securing means for the assembled headrest components.

Although only one form of this invention has been shown and described, other forms will be readily apparent to those skilled in the art.

What is claimed is:

1. A headrest comprising: a padding member including a resilient portion having an outer surface covered by a shell and an inner surface defining a pocket opening to the outer surface; a plastice reinforcing member including a base integrally formed with a honeycomb structure having walls defining a surface substantially conforming to the inner surface of the resilient portion, said reinforcing member being inserted through the opening and into the pocket with the walls of the honeycomb structure engaged in substantial contact with the inner surface of the resilient portion, said base portion closing said opening; and cooperating means on said padding member and said reinforcing member lockingly engageable with each other upon insertion of said reinforcing member within said pocket to retain said reinforcing member within said pocket.

2. A headrest as recited in claim 1 wherein the walls of the honeycomb structure are elongated walls having edges defining the surface substantially conforming to the inner surface defining the pocket.

3. A headrest as recited in claim 1 wherein the reinforcing member includes a support receptacle integrally formed therewith and the base has an opening providing access to the receptacle.

4. A headrest as recited in claim 1 wherein the cooperating means includes a plurality of retention tabs on the reinforcing member embedded within the resilient portion of the padding member.

References Cited

UNITED STATES PATENTS

| 3,063,751 | 11/1962 | Hatch | 297—410 |
| 3,205,005 | 9/1965 | Brown | 297—397 |
| 3,362,749 | 1/1968 | Clement | 297—412 |
| 3,400,979 | 9/1968 | James | 297—412 |

CASMIR A. NUNBERG, Primary Examiner

U.S. Cl. X.R.

297—397